Figure 7:
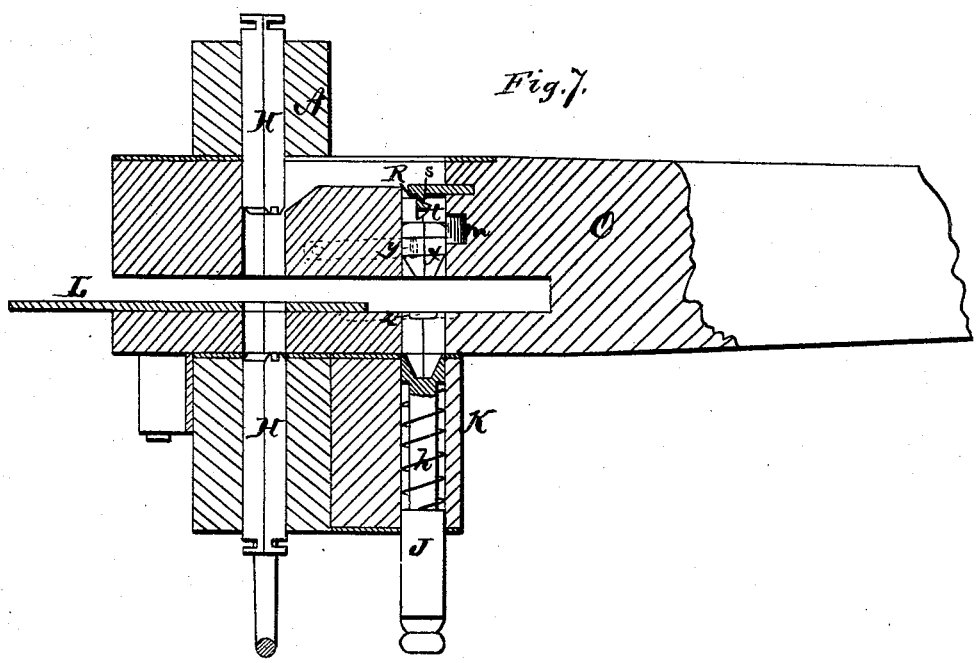

3 Sheets--Sheet 1.
C. N. BROWN.
Devices for Riveting the Teeth of Saws.
No. 147,236. Patented Feb. 10, 1874.
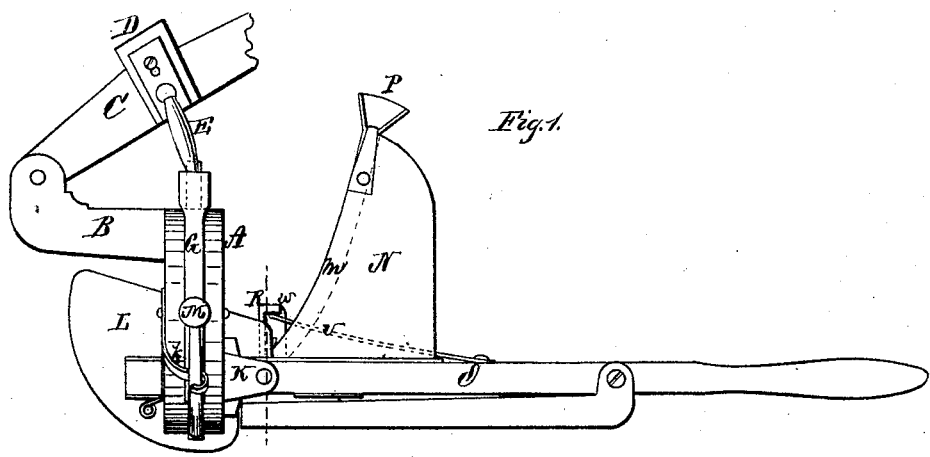
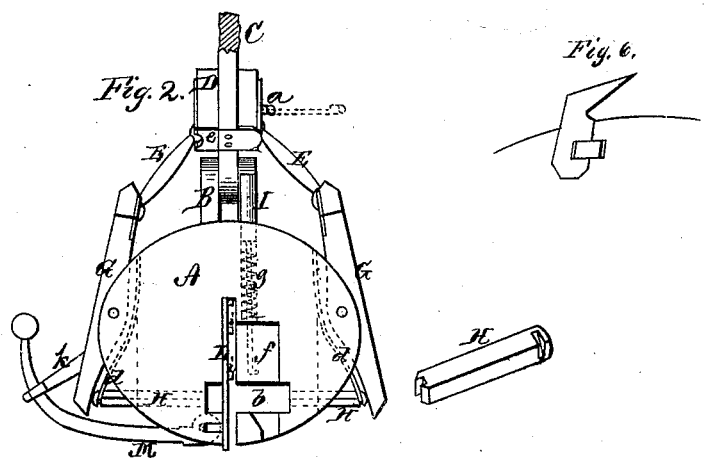
Witnesses:
Henry N. Miller
C. T. Curtis
Inventor.
Chas. N. Brown
per
Alexander Mason
Attorneys.
AM. PHOTO-LITHOGRAPHIC CO. N.Y. (OSBORNE'S PROCESS)

C. N. BROWN.
Devices for Riveting the Teeth of Saws.
No. 147,236. Patented Feb. 10, 1874.
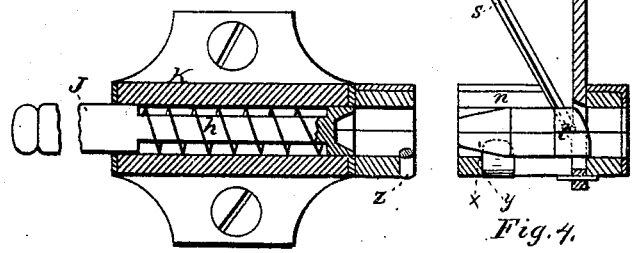
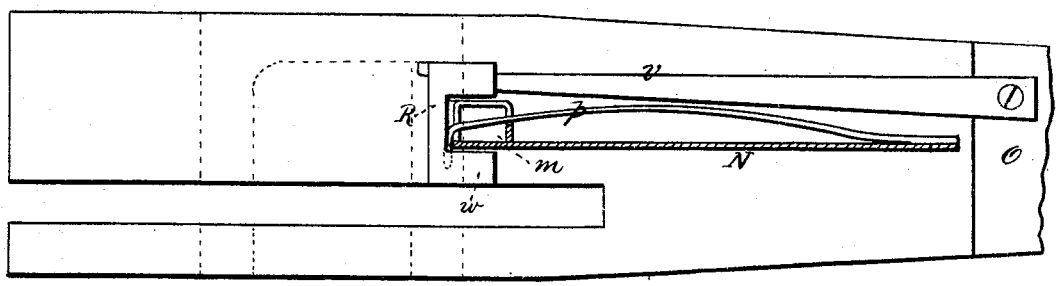
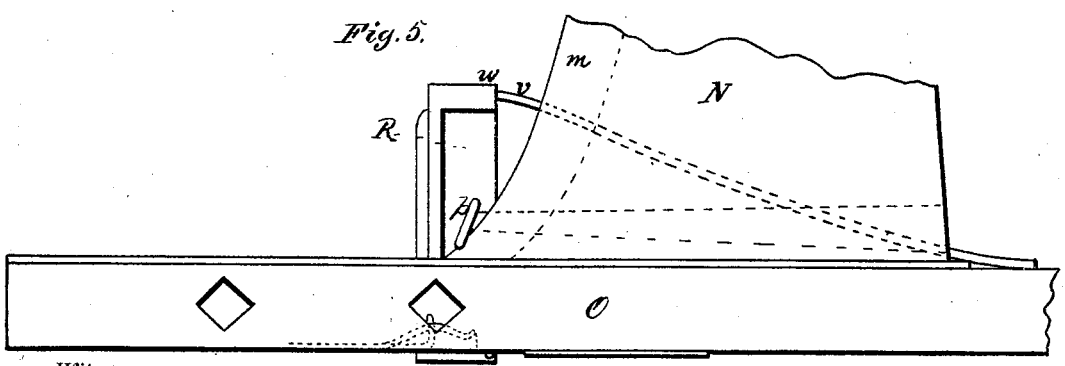

3 Sheets--Sheet 3.

C. N. BROWN.
Devices for Riveting the Teeth of Saws.

No. 147,236. Patented Feb. 10, 1874.

WITNESSES

INVENTOR

By

Attorneys.

UNITED STATES PATENT OFFICE.

CHARLES N. BROWN, OF PROVIDENCE, RHODE ISLAND.

IMPROVEMENT IN DEVICES FOR RIVETING THE TEETH OF SAWS.

Specification forming part of Letters Patent No. 147,236, dated February 10, 1874; application filed April 29, 1873.

*To all whom it may concern:*

Be it known that I, CHARLES N. BROWN, of Providence, in the county of Providence and in the State of Rhode Island, have invented certain new and useful Improvements in Device for Riveting Teeth in Saws; and do hereby declare that the following is a full, clear, and exact description thereof, reference being had to the accompanying drawings and to the letters of reference marked thereon, making a part of this specification.

Much difficulty has hitherto been experienced in riveting removable teeth in the plates of saws, from the fact that while the rivet is "headed down" with the hammer, which is the necessary process, the rivet is expanded laterally as it is upset, causing it to warp or spring the saw-plate, necessitating the rehammering of the saw to make it straight and fit for action, consequently saw operators cannot often insert teeth with rivets in a satisfactory manner. Furthermore, the rivets are made of sufficient length to project beyond the surface of the plate on either side, and, when hammered down, still remain thicker than the plate of the saw, requiring to be filed down flush with the saw-plate, and even then the action of the saw in working often throws out a burr, which must again be filed off, or it will impede the working of the saw in a proper manner. This filing off rivets in a finished saw is very objectionable, as it must injure the surface and appearance of the saw-plate by the file coming in contact therewith; besides, the operation necessarily requires more time than ought to be used in the whole process of inserting and securing the rivet or key.

My invention is intended to obviate all these difficulties. My rivets or keys are made of the proper length to suit the gage of the saw, and are less in length or thickness than the plate of the saw, consequently fall short of the surface of the saw on either side when first inserted. They are secured by means of a swaging cut, made with a chisel of suitable form, adapted to the work, which incises the ends of the rivet near the edges, and turns down a burr into a chamfer made near the edges of the incision cut in the tooth and plate for the key or rivet. Thus the key or rivet is not upset or enlarged, and consequently will not strain the saw beyond what is desired, as it is made to fit the incision more or less closely, as may be desired, in that class of saws and keys. To avoid too great nicety of adjustment, the square or elongated square keys are preferred, made as shown in Fig. 6. It will be seen at once that the strain upon the keys will be in a line with the radius of the saw, both by the centrifugal force of revolving and the drawing force of cutting, therefore there is no necessity for a close fit upon the right and left sides of the key; but they may be even open, and yet the tooth will be perfectly secured. Thus no strain is required in that direction, which is the only cause of the warping of the plates before named, requiring a rehammering of the saws. The burrs are turned into the chamfer on the top and bottom of the key, but they may be turned in on the sides in place of at the top and bottom, if so desired.

In order to enable others skilled in the art to which my invention appertains to make and use the same, I will now proceed to describe its construction and operation, referring to the annexed drawing, in which—

Figure 1 is a side view of my entire machine. Fig. 2 is a view of the rear side of the head with the handle removed. Figs. 3, 4, and 5 are detached views of certain parts of the machine; and Fig. 6 represents a part of a saw-plate with a tooth inserted and fastened therein by a key or rivet. Fig. 7 is a horizontal section through the head and portion of the handle.

A represents the head of my machine, made in oval form, as shown in Fig. 2, and provided on its front side at the upper edge with a forward-projecting arm, B, the front end of which is turned upward and forked. In this fork is pivoted a lever, C, which extends toward the rear, and to which is attached a yoke, D, the yoke straddling the lever on top. From the sides of the yoke D rods or bars E extend to and connect with the upper ends of levers G, which are pivoted in slots or grooves in the side of the head A. The connections between the rods E E and their respective levers G G, as well as with the yoke D, are formed of ball-and-socket joints. The lower ends of the levers G G press against the outer ends of double-edged chisels H H, which pass from opposite sides horizontally through the head A into a mortise, b, made in the same. The outer ends of the chisels H H are held by slotted springs d d. After the chisels have been pressed inward by the levers G G, and the levers resumed their position, the springs d d draw the chisels outward again. On the under side of the lever C is a plate, e, which, as the lever is pressed down, acts upon a driver, I, that passes vertically through the head A into a recess, f, formed in the rear side of the same, immediately above the mortise b. A spring, g, throws the driver I up again as soon as the lever C is raised. On the rear side of the head A is formed or attached a box, K, in which, lying parallel to the face of said head, is a driver or plunger, J, surrounded by a spiral spring, h, to draw the same outward. Through the head A is made a vertical slot passing through the mortise b, and alongside of the recess f. In this slot is a plate, L, supported against one side of the head by suitable slides, and against which the saw is to be placed. M is a cam-lever, to force the plate against the saw, and the latter against the wall of the slot, the lever when not in use being held by a spring, k, as shown in Figs. 1 and 2. The plate L is on the inner side provided with three pins i i, which are placed according to the position of the teeth in the saw to be riveted. O represents the handle, which passes through the mortise b in the head A, and is slotted for a suitable distance rearward from the front end in line with the slot in the head, for the saw to pass through, and to admit of a certain sliding movement of the handle through the head; and in order that this movement may not be obstructed by one of the chisels, one side of the handle is grooved sufficiently deep to clear the end of the chisel H on that side; holes are also made in the handle for the passage of the said chisels and the plunger J. On the handle O is a plate, N, carrying at its upper end a hopper or reservoir, P, from which a channel, m, leads downward to a transverse passage, n, in the handle, the lower end of said channel being closed by a spring, p. The passage n in the handle O extends transversely through the same from the bottom of the channel m to the slot in the handle, and opposite this end of the passage through that portion of the handle on the other side of the slot is a corresponding passage—or, in other words, a continuation of the passage n. In this passage from one side of the slot to the other moves a locating-plunger, x, constructed as shown in Figs. 3 and 7, one end being pointed so as to pass readily into and through the rivet-hole in the saw-plate and tooth. When the locating-plunger is in the continuation of the passage n, just mentioned, it is moved by the driver J across the slot, and into the main part of the said passage. At the proper time, the locating-plunger is returned to its former place by the following means: In the inner end of the passage n is a wedge, R, which operates up and down, and this wedge has a groove, s, into which extends a pin or projection from a block, t, in the passage n. As the wedge R is forced down, as hereinafter described, the block t is moved sidewise in the passage, and as the rivet to be inserted in the saw has been deposited between the said block and the locating-plunger, the block t drives both the plunger and the rivet out of the main part of the passage n. The locating-plunger x is held after each stroke by means of a suitable spring, y or z, so that it cannot accidentally be moved out of its place, but only by the means above described. The wedge R is held up by a spring, v, that presses against a projection at its upper end, and a similar projection, w, on the opposite side, to operate the spring p.

The operation of the machine is as follows: The keys or rivets are first dropped into the hopper or reservoir P, a number sufficient to rivet all of the teeth in the saw. One downward movement of the lever C is made, which opens the valve-spring p, allowing one rivet or key to drop into the channel n. This is accomplished by the handle O being pushed in so that the wedge R lies in the bottom of the recess f, and when the lever C is pressed down the plunger or driver I forces the wedge R downward, the projection w on the same opening the spring p. The locating-plunger x, shown in Fig. 3, must then be forced back against the rivet or key by means of the driver J, after the handle has been drawn out, and the plunger x secured in position by the spring y, while the driver J is withdrawn and retained in its proper position by means of the spiral spring h, and the machine is then ready to be located upon the saw for inserting the key or rivet. The machine being pressed firmly down with the two back pins i on the saw, it is pushed backward by the handle O until it stops against the front pin in the plate L. The head A is then secured by the cam-lever M, and the sliding handle O pushed back till the wedge R lies in the bottom of the recess f, when it is in the proper position for inserting the rivet. The pin a is then withdrawn from the lever C, and, while the left hand holds the sliding handle O, the lever C is brought down with the right hand and the plate e moves the driver I, which forces the wedge R, and drives the wedge-block t against the rivet. This moves the locating-plunger x through the plate and tooth, bringing both to the proper position to receive the key or rivet which follows it, and stops in the proper place in the plate. The locating-plunger x remains in the opposite side of the sliding handle O, and is prevented from displacement by a spring, z. This movement of the lever C, also, by the projection w on the wedge R, opens the valve-spring p and allows another key or rivet to drop out of the channel m, so that when the wedge R is raised by its spring v, and the wedge-block t by it moved back, this second key or rivet will fall into the channel n in its proper place. The lever C must be brought fully down, and the rivet will be fully inserted at the first downward motion of the lever; otherwise, if allowed to rise up and move down the second time, the valve-spring $p$ is again opened and two rivets are dropped into the channel $n$ before one is inserted, thus clogging the machine. When the rivet is inserted, the sliding handle O is drawn forward and the swaging-chisels H H are brought over the rivet and are forced into each end of the rivet by means of the levers G G, moved by the arms E E, acted upon by the top lever C, which has been fastened to the yoke D by the pin $a$, and thus, by a single downward movement of the lever C, the rivet or key is swaged by the cutting-chisels turning burrs upon the corners into the chamfers made in the saw-plate, and thus securing them firmly from lateral displacement, and they, being of less length than the thickness of the plate, require no filing, but are completely finished. The cam-lever M is then raised and held by the spring $k$, the machine removed from the saw, the sliding handle pressed back, and the locating-plunger $x$ again forced against the rivet by the driver J, when the machine is ready for another tooth.

Having thus fully described my invention, what I claim as new, and desire to secure by Letters Patent, is—

1. The combination of the lever C, yoke D, ball-and-socket jointed arms E E, and levers G G, all substantially as and for the purposes herein set forth.

2. The combination of the levers G G, chisels H H, and springs $d\ d$, substantially as and for the purposes herein set forth.

3. The driver I, with spring $g$ arranged in the head A, and operated by the lever C, substantially as and for the purposes herein set forth.

4. The driver J with spring $h$, arranged on the head A to operate in the sliding handle O, substantially as and for the purposes herein set forth.

5. The plate L with pins $i\ i$, arranged in the slot in the head A, substantially as and for the purposes herein set forth.

6. The combination of the head A, plate L, cam-lever M, and spring $k$, substantially as and for the purposes herein set forth.

7. The plate N, with reservoir P, channel $m$, and valve-spring $p$, arranged on the sliding handle O, substantially as and for the purposes herein set forth.

8. The projection $w$ on the wedge R for operating the valve-spring $p$, as and for the purposes set forth.

9. The wedge R provided with the groove $s$ and operating the wedge-block $t$ in the channel $n$ on the sliding handle O, substantially as and for the purposes herein set forth.

10. The locating-plunger $x$, arranged to operate in the channel $n$ on the sliding handle O, substantially as and for the purposes herein set forth.

In testimony that I claim the foregoing I have hereunto set my hand this 25th day of February, 1873.

CHARLES N. BROWN.

Witnesses:
HENRY MARTIN,
JOHN C. PURKIS.